US010975789B2

(12) United States Patent
Martz et al.

(10) Patent No.: US 10,975,789 B2
(45) Date of Patent: Apr. 13, 2021

(54) SYSTEMS AND METHODS FOR EXPEDITING ENGINE WARMING

(71) Applicant: Ford Global Technologies, LLC, Dearborn, MI (US)

(72) Inventors: Jason Martz, Canton, MI (US); Eric Matthew Kurtz, Dearborn, MI (US); David Hanna, Troy, MI (US); Daniel Joseph Styles, Canton, MI (US); Eric Curtis, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 16/001,742

(22) Filed: Jun. 6, 2018

(65) Prior Publication Data
US 2019/0376461 A1 Dec. 12, 2019

(51) Int. Cl.
*F02D 41/00* (2006.01)
*F02D 41/02* (2006.01)
(Continued)

(52) U.S. Cl.
CPC ...... *F02D 41/0255* (2013.01); *F02B 29/0418* (2013.01); *F02D 41/0007* (2013.01);
(Continued)

(58) Field of Classification Search
CPC .............. Y02T 10/144; F02D 41/0007; F02D 41/0255; F02D 41/029; F02D 41/068;
(Continued)

(56) References Cited

U.S. PATENT DOCUMENTS 5,704,323 A * 1/1998 Gardell .................. F02B 37/04
123/179.18
6,938,420 B2 * 9/2005 Kawamura ............. F02B 33/34
60/612
(Continued)

FOREIGN PATENT DOCUMENTS

WO 2015092290 A1 6/2015
WO 2015140617 A1 9/2015

OTHER PUBLICATIONS

Kindl, H., "Systems and Method For Charge Air Cooler De-icing" U.S. Appl. No. 15/872,519, filed Jan. 16, 2018, 44 pages.
Fulton, B.,"System and Method For Starting an Engine" U.S. Appl. No. 15/912,395, filed Mar. 5, 2018, 51 pages.

*Primary Examiner* — Gonzalo Laguarda
(74) *Attorney, Agent, or Firm* — Geoffrey Brumbaugh McCoy Russell LLP

(57) ABSTRACT

Methods and systems are provided for expediting heating of an engine and an emissions device upon cold startup of the engine. In one example, a method may include prior to cold startup of an engine, operating an e-compressor and opening a recirculation valve of a recirculation passage coupled across the e-compressor to flow compressed intake air from an outlet of the e-compressor through the recirculation passage to an inlet of the e-compressor and starting the engine upon a temperature at the outlet of the e-compressor reaching a threshold and continuing to operate the e-compressor while the engine is on. The heated intake air resulting from the flow of compressed intake air through the recirculation passage raises a temperature of combustion and a temperature of exhaust gas, which may decrease catalyst light-off time of the emissions device.

19 Claims, 8 Drawing Sheets

(51) Int. Cl.
*F02D 41/06* (2006.01)
*F02B 29/04* (2006.01)
*F02B 39/10* (2006.01)
*F02B 37/04* (2006.01)
*F02B 37/12* (2006.01)

(52) U.S. Cl.
CPC ......... *F02D 41/029* (2013.01); *F02D 41/068* (2013.01); *F02B 37/04* (2013.01); *F02B 37/12* (2013.01); *F02B 39/10* (2013.01); *F02D 41/064* (2013.01); *F02D 2200/021* (2013.01); *F02D 2200/0802* (2013.01); *Y02T 10/12* (2013.01)

(58) Field of Classification Search
CPC ........... F02D 2200/0414; F02D 41/064; F02B 39/10; F02B 39/0418; F02B 39/08; F02B 33/40
USPC .................................................. 123/565, 562
See application file for complete search history.

(56) References Cited

U.S. PATENT DOCUMENTS

| | | | |
|---|---|---|---|
| 7,096,667 B2* | 8/2006 | Laster | F02C 9/18 60/723 |
| 9,109,505 B2* | 8/2015 | Ulrey | F02B 47/08 |
| 9,309,837 B2* | 4/2016 | Ulrey | F02D 41/0065 |
| 9,874,191 B2 | 1/2018 | Xiao et al. | |
| 10,550,784 B2* | 2/2020 | Fulton | F02B 33/44 |
| 10,563,571 B2* | 2/2020 | Kindl | F02D 41/0077 |
| 2010/0300405 A1 | 12/2010 | Uhrich et al. | |
| 2015/0047340 A1 | 2/2015 | Ulrey et al. | |
| 2015/0083092 A1 | 3/2015 | Desai | |
| 2015/0128907 A1* | 5/2015 | Redon | F02B 75/12 123/46 R |
| 2015/0285161 A1* | 10/2015 | Ulrey | B60W 20/16 477/3 |
| 2017/0051659 A1* | 2/2017 | Banker | F02B 37/12 |
| 2018/0016967 A1* | 1/2018 | Moore | F02B 33/44 |
| 2018/0016993 A1* | 1/2018 | Moore | F02D 13/0219 |

* cited by examiner

SYSTEMS AND METHODS FOR EXPEDITING ENGINE WARMING

FIELD

The present description relates generally to methods and systems for warming a vehicle engine prior to cold start and restart.

BACKGROUND/SUMMARY

During initial engine startup, subsequent to a period of time where the engine is off and engine components allowed to cool, fuel may be combusted at combustion chambers of the engine, generating exhaust gas. Emission devices, such as three-way catalytic converters in spark-ignition engines and selective catalytic reduction in diesel-powered engines, may be arranged in a vehicle exhaust system downstream of the combustion chambers to treat exhaust emissions. The emission devices may require a period of time following engine startup to warm to a temperature at which catalysts of the devices are activated. Upon reaching the activation temperature after a duration of time known as light-off, the emission devices may efficiently treat regulated combustion products such as particulate matter, nitrogen oxides ($NO_x$), carbon monoxide (CO), and hydrocarbons before releasing the exhaust gas to the atmosphere.

Catalytic conversion efficiency during light-off may be low, leading to undesirable release of exhaust emissions during early stages of driving. Furthermore, fuel combustion when a temperature of the engine intake is low may result in marginal or incomplete combustion, poor engine performance and drivability, as well as vehicle noise, vibration, and harshness (NVH). Use of electrical heating devices, such as intake air heaters, to warm the engine during startup are impractical solutions due to a size and cost of such appliances.

Other attempts to address faster engine and catalyst heating include using an electrically assisted compressor to heat intake air. One example approach is shown by Uhrich et al. in US 2010/0300405. Therein, a boosting device is at least partially driven by an electric motor to boost intake air delivered through a fuel vapor canister to release fuel vapor stored in the canister during an engine cold start condition. The fuel vapor is combusted in the engine cylinders, heating the cylinders as well as an emission control device. Use of the fuel vapor for combustion may also improve air-fuel mixing and decrease emissions during catalyst light-off.

However, the inventors herein have recognized potential issues with such systems. As one example, heating of the engine combustion chambers and emission control device via exhaust heat produced during combustion of the fuel vapors may still be relatively slow and dependent on an amount of stored fuel vapor. For example, if the engine is operated under cool ambient conditions, lower evaporation of fuel may result in a small volume of stored fuel vapor. The amount may be insufficient to effectively accelerate heating of the engine and emissions device.

In one example, the issues described above may be addressed by a method including prior to cold startup of an engine, operating an e-compressor and opening a recirculation valve of a recirculation passage coupled across the e-compressor to flow compressed intake air from an outlet of the e-compressor through the recirculation passage to an inlet of the e-compressor and starting the engine upon the temperature at an outlet of the e-compressor reaching a threshold temperature and continuing to operate the e-compressor while the engine is on.

In this way, engine warming and catalyst light-off may be expedited by energy transfer from an electrically driven compressor (e-compressor). As one example, an engine system may be adapted with a recirculation passage coupling an intake passage downstream of the e-compressor outlet to the intake passage upstream of the compressor inlet. Air may be recirculated through the recirculation passage to return to the e-compressor, prior to cold engine startup, thereby increasing a temperature of the air (or air/burnt gas mixture) before delivery to the engine intake. Engine combustion may be delayed to allow the intake air temperature to increase to a threshold temperature, thereby facilitating faster warming of an emissions device the exhaust system. Heating of intake air by recirculation through the e-compressor may also be used to regenerate a diesel particulate filter.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
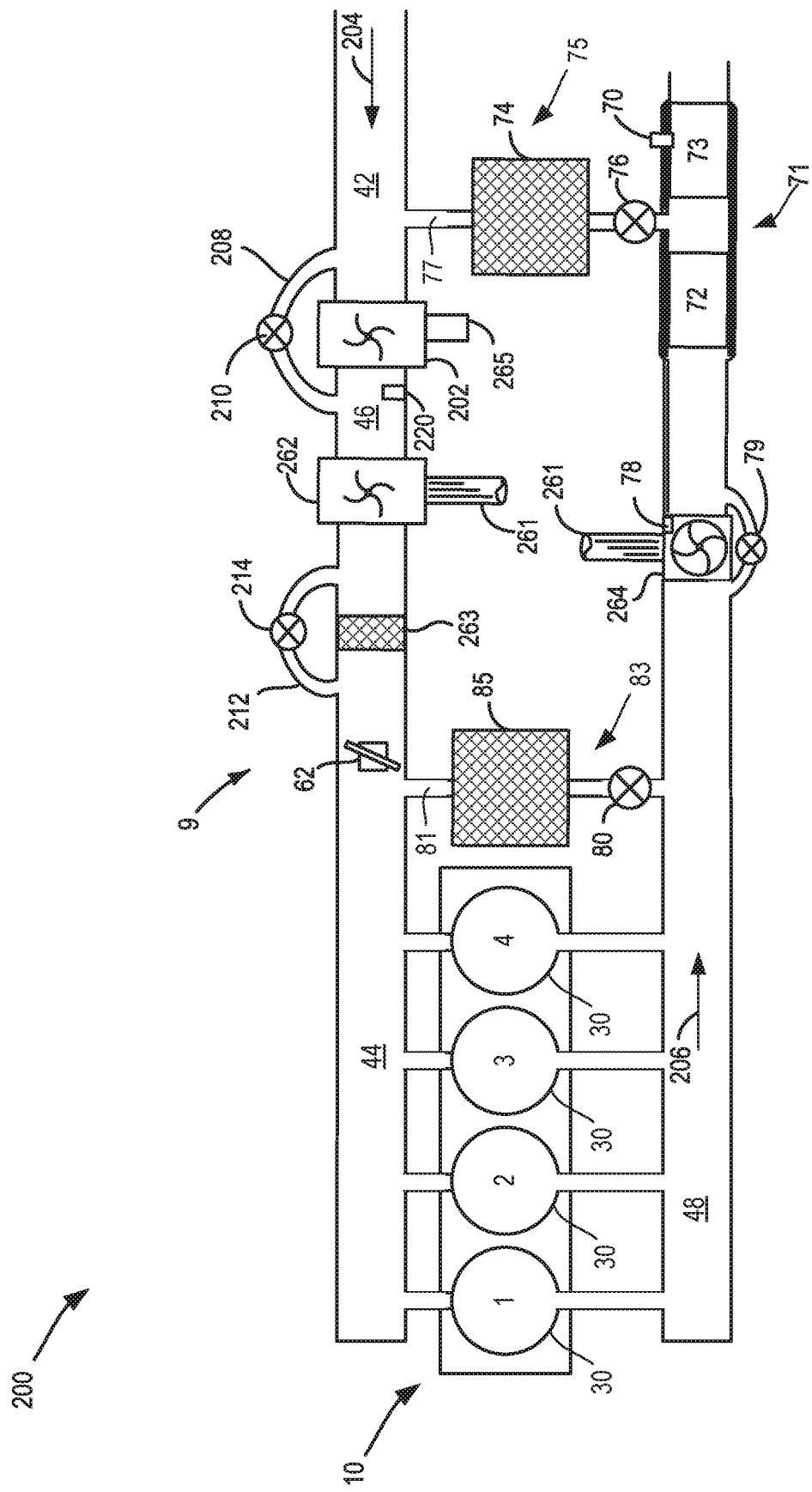
FIG. 2 shows a first embodiment of an engine system with an electric compressor upstream of a turbocharger, configured to warm intake air by recirculating the air through a compressor recirculation passage while mass flow to the engine is throttled.
Figure 3:
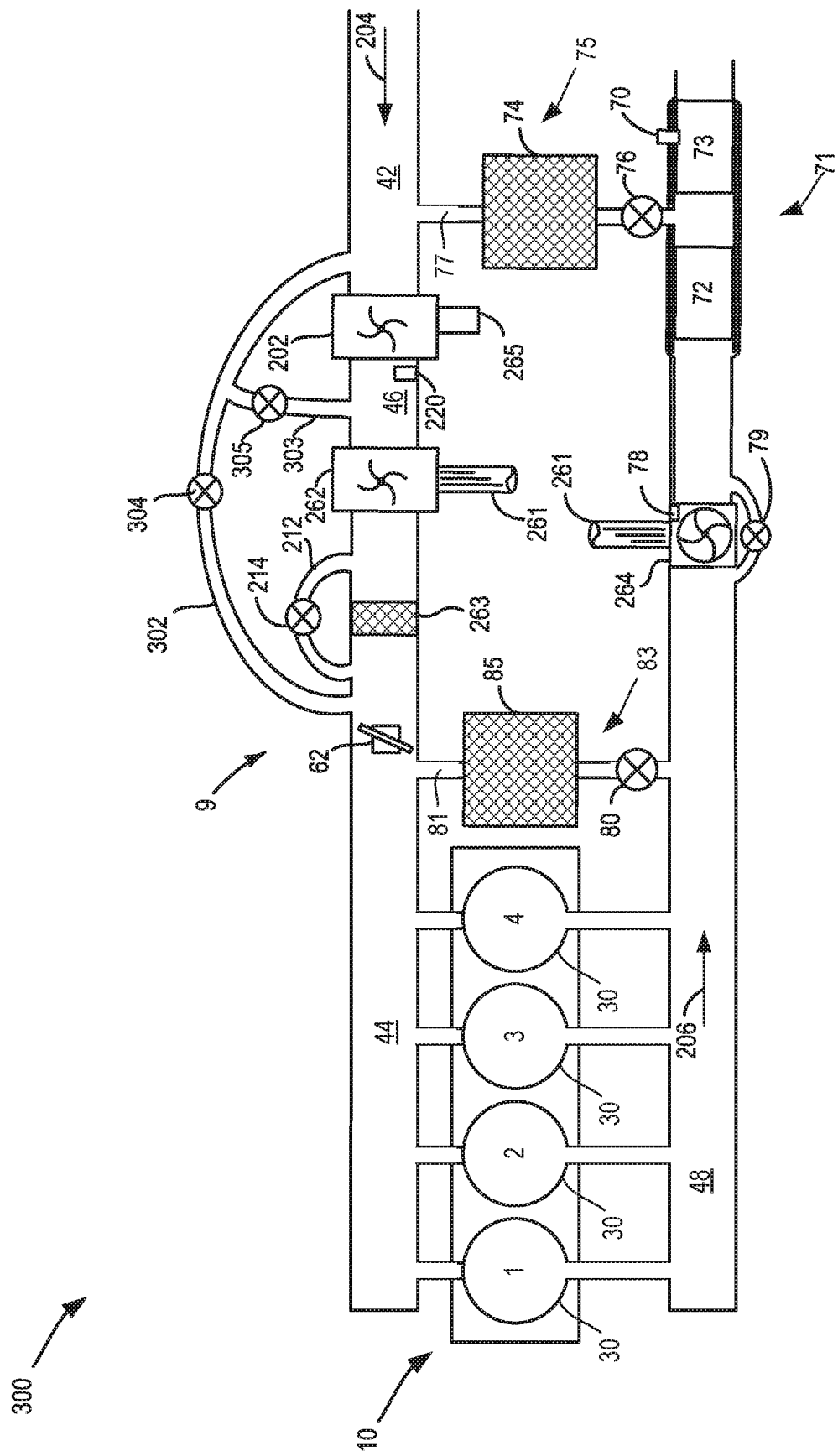
FIG. 3 shows a second embodiment of an engine system with an electric compressor upstream of a turbocharger, configured to warm intake air by recirculating the air through a compressor recirculation passage.
Figure 4:
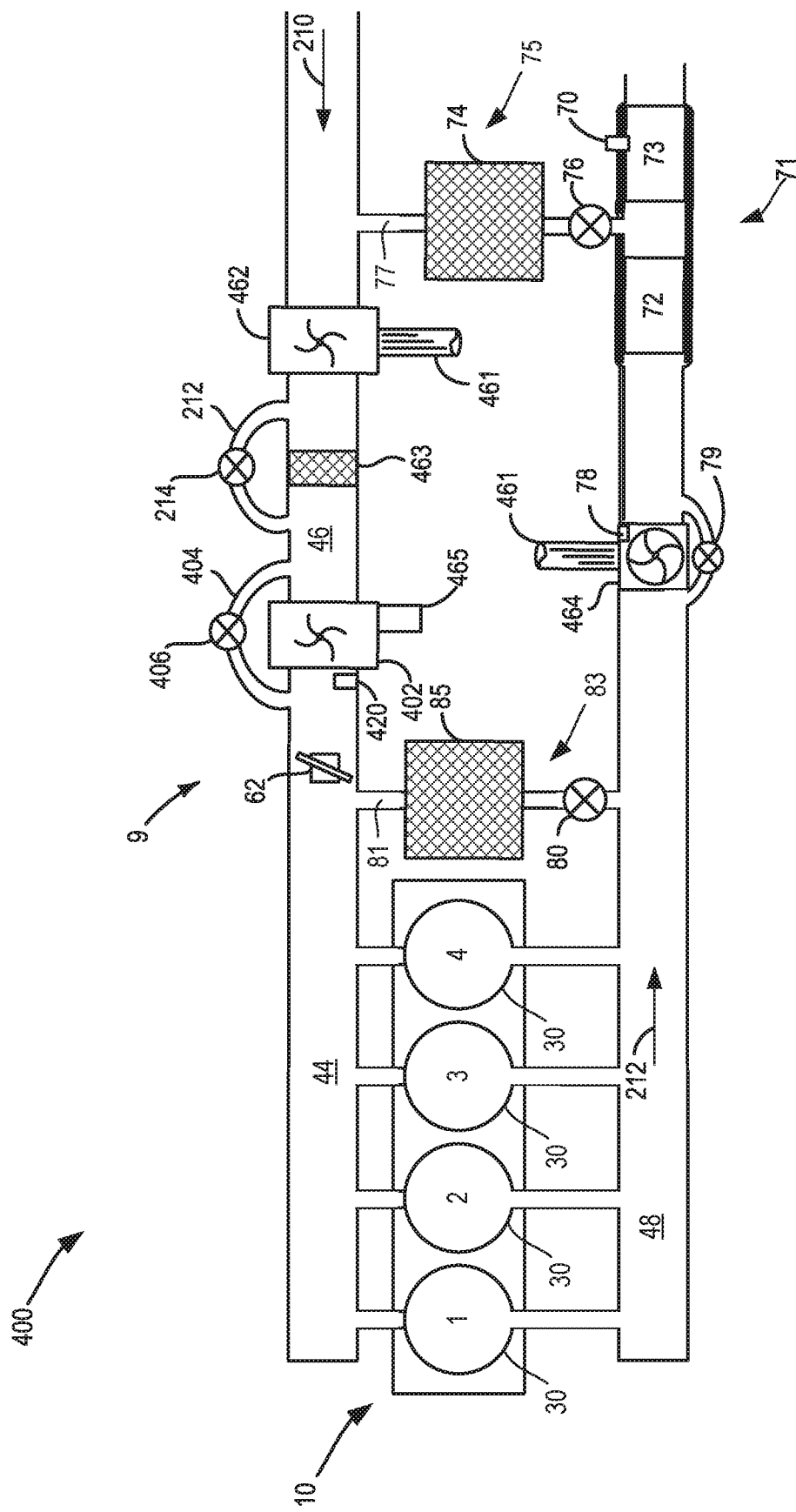
FIG. 4 shows a third embodiment of an engine system with an electric compressor downstream of a turbocharger, configured to warm intake air by recirculating the air through a compressor recirculation passage.
Figure 5:
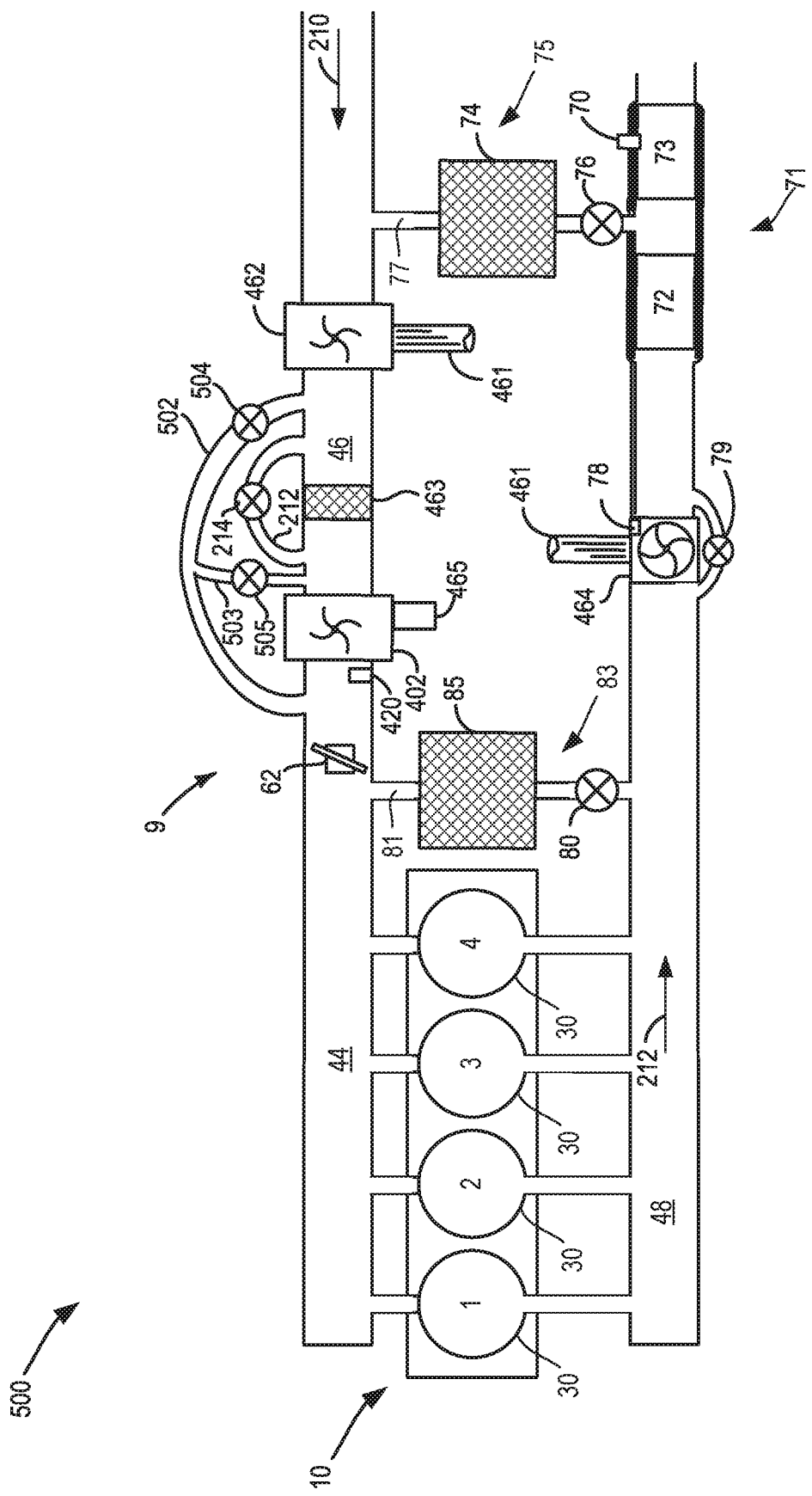
FIG. 5 shows a fourth embodiment of an engine system with an electric compressor downstream of a turbocharger, configured to warm intake air by recirculating the air through a compressor recirculation passage.

The following description relates to systems and methods for recirculating air though an electrically-driven compressor to heat an engine and an emission control device. The air in an intake passage, downstream of the compressor, may be recirculated to an inlet of the compressor through a compressor recirculation passage. A hybrid vehicle may be adapted with the compressor recirculation passage, as shown in a schematic of a hybrid engine system in FIG. 1. Different configurations of the compressor recirculation passage are depicted in FIGS. 2-5, showing how the compressor recirculation passage may be positioned around the electrically-driven compressor or both the electrically-driven compressor and a charge-air cooler (CAC). The electrically-driven compressor may be positioned upstream of a turbocharger compressor, as shown in FIGS. 2 and 3, or downstream of the turbocharger compressor, as shown in FIGS. 4 and 5. The electrically-driven compressor may be operated prior to engine cold starts or restarts when the engine and the emission control device are at temperatures where the efficiency of the emissions control device is low, such as below light-off temperature. Examples of routines for operating the electrically-driven compressor to expedite engine heating and catalyst light-off are given in FIGS. 6-7, providing details of controls and operations involved in the heating of the engine and catalyst. Adjustments of different actuators in response to engine operating parameters are shown in FIG. 8, prior to and during a cold engine start as well as during increased torque demand during engine operation at pre-warmed temperatures.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 1:
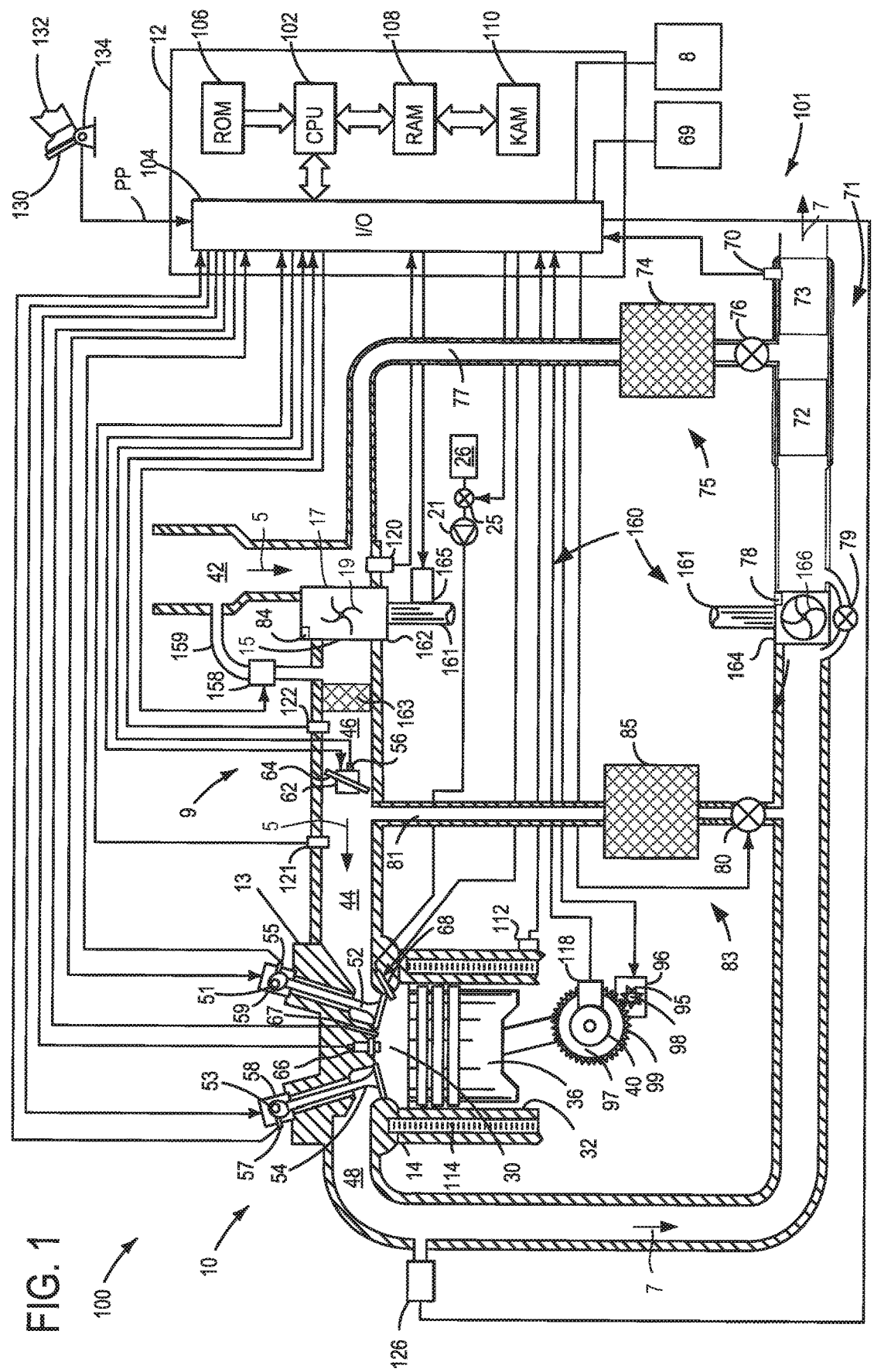
FIG. 1 shows a schematic diagram of a hybrid engine system that includes a recirculation passage around a compressor.

Referring to FIG. 1, an example boosted engine system 100 is illustrated in FIG. 1, comprising an engine 10 of a vehicle 101. Vehicle 101 may be a hybrid electric vehicle with multiple sources of torque available to one or more vehicle wheels. Engine 10, comprising a plurality of cylinders, one cylinder of which is shown in FIG. 1, may be controlled by electronic engine controller 12. The controller 12 receives signals from the various sensors of FIG. 1 and employs the various actuators of FIG. 1 to adjust engine operation based on the received signals and instructions stored on a memory of the controller 12.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake poppet valve 52 may be operated by a variable valve activating/deactivating actuator 59, which may be a cam driven valve operator. Likewise, exhaust poppet valve 54 may be operated by a variable valve activating/deactivating actuator 58, which may a cam driven valve operator. Intake poppet valve 52 and exhaust poppet valve 54 may be deactivated and held in a closed position preventing flow into and out of cylinder 30 for one or more entire engine cycles (e.g. two engine revolutions), thereby deactivating cylinder 30. Flow of fuel supplied to cylinder 30 may also cease when cylinder 30 is deactivated.

Fuel injector 68 is shown positioned in cylinder head 13 to inject fuel directly into combustion chamber 30, known to those skilled in the art as direct injection. Fuel is delivered to fuel injector 68 by a fuel system including a fuel tank 26, fuel pump 21, fuel pump control valve 25, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Engine air intake system 9 includes intake manifold 44, throttle 62, charge-air cooler (CAC) 163, turbocharger compressor 162, and intake plenum 42. Intake manifold 44 is shown communicating with optional electronic throttle 62 which adjusts a position of throttle plate 64 to control air flow from intake boost chamber 46. Compressor 162 draws air from air intake plenum 42 to supply boost chamber 46. Compressor vane actuator 84 adjusts a position of compressor vanes 19. Turbine 164 is coupled to compressor 162 via shaft 161, all three components included in turbocharger 160.

In one example, as shown in FIG. 1, turbocharger 160 may be an electric turbocharger where the shaft 161 is coupled to an electric machine 165. Electric machine 165 may be a motor or a motor/generator. When an increase in boost is requested, e.g., as indicated by a tip-in at accelerator pedal 130, turbocharger 160 may be spun by electric machine 165 during an initial period when exhaust gas pressure is insufficient to spin-up turbine 164 to meet the boost demand. The electric machine 165 may continue driving the rotation of the turbocharger 160 until exhaust gas pressure is determined to be high enough rotate the turbine 164 to provide boost to the engine. The electric machine 165 may be deactivated, transferring a rotational work source from the electric machine 165 to the exhaust gas. In this way, turbo lag may be reduced.

Compressor speed may be adjusted via adjusting a position of a turbine variable vane control actuator 78 or compressor recirculation valve 158. In alternative examples, a waste gate 79 may replace or be used in addition to turbine variable vane control actuator 78. Turbine variable vane control actuator 78 adjusts a position of variable geometry turbine vanes 166. Exhaust gases may pass through turbine 164 supplying little energy to rotate turbine 164 when vanes 166 are in an open position. Exhaust gases may pass through turbine 164 and impart increased force on turbine 164 when vanes 166 are in a closed position. Alternatively, waste gate 79 or a bypass valve may allow exhaust gases to flow around turbine 164 so as to reduce the amount of energy supplied to the turbine. Compressor recirculation valve 158 allows compressed air at the outlet 15 of compressor 162 to be returned to the inlet 17 of compressor 162 through recirculation passage 159. Alternatively or additionally, a position of compressor variable vane actuator 78 may be adjusted to change the efficiency of compressor 162. In this way, the efficiency of compressor 162 may be reduced so as to affect the flow of compressor 162 and reduce the possibility of compressor surge. Further, by returning air back to the inlet of compressor 162, work performed on the air may be increased, thereby increasing the temperature of the air. Air flows into engine 10 in the direction of arrows 5.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, accelerator pedal position, battery SOC, etc.). Battery 8 may supply electrical power to starter 96 and electric machine 165. Controller 12 may monitor battery state of charge.

Combustion is initiated in the combustion chamber 30 when fuel automatically ignites via combustion chamber temperatures reaching the auto-ignition temperature of the fuel that is injected to cylinder 30. The temperature in the cylinder increases as piston 36 approaches top-dead-center compression stroke. In some examples, a universal Exhaust Gas Oxygen (UEGO) sensor 126 may be coupled to exhaust manifold 48 upstream of emissions device 71. In other examples, the UEGO sensor 126 may be located downstream of one or more exhaust after treatment devices. Further, in some examples, the UEGO sensor 126 may be replaced by a $NO_x$ sensor that has both $NO_x$ and oxygen sensing elements.

At lower engine temperatures optional glow plug 66 may convert electrical energy into thermal energy so as to create a hot spot next to one of the fuel spray cones of an injector in the combustion chamber 30. By creating the hot spot in the combustion chamber next to the fuel spray 30, it may be easier to ignite the fuel spray plume in the cylinder, releasing heat that propagates throughout the cylinder 30, raising the temperature in the combustion chamber, and improving combustion. Cylinder pressure may be measured via optional pressure sensor 67, alternatively or in addition, sensor 67 may also sense cylinder temperature.

Emissions device 71 may include a diesel particulate filter (DPF) 72 for a diesel engine or a gas particulate filter (GPF) 72 for a gasoline engine. In other examples, emissions device 71 may additionally or alternatively include a diesel oxidation catalyst and/or $NO_x$ cold start catalysts. A selective catalytic reduction (SCR) catalyst 73 for a diesel engine or a three-way catalytic converter (TWCC) 73 for a gasoline engine may be positioned downstream of the DPF/GPF 72. In another example, DPF/GPF 72 may be positioned downstream of SCR/TWCC 73. Temperature sensor 70 provides an indication of SCR/TWCC temperature. Exhaust flows in the direction of arrows 7.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of emissions device 71 to a location in the en0gine air intake system downstream of compressor 162. EGR may be cooled via passing through EGR cooler 85. EGR may also be provided via low pressure EGR system 75. Low pressure EGR system 75 includes EGR passage 77 and EGR valve 76. Low pressure EGR may flow from emissions device 71 between the DPF/GPF 72 and the SCR/TWCC 73 to a location upstream of compressor 162. Low pressure EGR system 75 may include an EGR cooler 74.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44 (alternatively or in addition sensor 121 may sense intake manifold temperature); boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); a measurement of throttle position from sensor 56; and a measurement of the temperature of the SCR/TWCC from sensor 70. Barometric pressure may also be sensed (sensor not shown) for processing by controller 12.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Engine 10 may be included in a hybrid vehicle in a variety of configurations, which are shown in FIGS. 2-5. The various engine configurations may include all or only a fraction of the components that are shown in FIG. 1. Further, some of the configurations may include additional components that are not shown in FIG. 1. Numeric labels for engine 10 and its associated components are maintained in FIGS. 2-5. Further, components shown in FIG. 1 and that are included in FIGS. 2-5 operate as described according to FIG. 1 and are labeled with the same numeric labels. Therefore, for the sake of brevity, the description of these elements will not be repeated. In addition, once a new component has been introduced in FIGS. 2-5 and described, its description will not be repeated for the sake of brevity.

The engine 10 of FIG. 1 includes a single boosting device, e.g., the turbocharger 160, that may be exhaust-driven or electrically-driven. In other examples of the engine, however, the turbocharger may be assisted by an additional compressor that may be rotated by an electric machine. In such configurations, as shown in FIGS. 2-5, the electric compressor may be positioned upstream or downstream of the turbocharger compressor, as well as upstream of downstream of the CAC. The electric compressor may operate as an additional boosting device to supplement compression of intake air provided by the turbocharger and decrease a likelihood of turbo lag.

An example 200 of engine 10 adapted with an electric compressor in addition to a turbocharger compressor is shown in FIG. 2 with four individual cylinders 30 that are numbered 1-4. In this example, engine 10 includes an electrically driven compressor (hereafter, e-compressor) 202 that may be rotated via electric machine 265. E-compressor 202 is positioned upstream of a turbocharger compressor 262 and downstream of a region where EGR passage 77 of the LP-EGR system 75 merges with the intake plenum 42. E-compressor 202 may be selectively activated and deactivated via the controller, e.g., controller 12 of FIG. 1. In addition, the speed of electric machine 265 and e-compressor 202 may be controlled and adjusted by the controller to control boost pressure. In contrast, turbocharger compressor 262 is driven via exhaust turbine 264 and not driven via the electric machine 265. Air flows into engine 10 in the direction of arrow 204 and exhaust flows out of engine 10 in the direction of arrow 206.

The intake plenum 42 may include a recirculation passage 208 that allows air to flow around the e-compressor 202, from downstream of the e-compressor 202 to upstream of the e-compressor 202 in a direction opposite of flow through the intake plenum 42. Flow through the recirculation passage 208 may be controlled by a recirculation valve 210. In one example, the recirculation valve 210 may be a variable flow valve, configured to return excess air flow to an inlet of the e-compressor 202, decreasing a likelihood of compressor surge and allowing the e-compressor 202 to operate at mass air flow rates in excess of those demanded by the engine. Recirculation valve 210 may be adjusted between a fully open position and a fully closed position, or configured to be continuously adjustable to any position between the fully open and fully closed positions. Thus, when recirculation valve 210 is at least partially open, e.g., not closed, a portion of the intake air flowing through intake plenum 42 may be channeled through the recirculation passage 208 at an inlet of the recirculation passage 208 downstream of the e-compressor 202 in the boost chamber 46 to return to the intake plenum 42 through an outlet of the recirculation passage 208, upstream of the e-compressor 202. Air that is already compressed by e-compressor 202 may be warmed as a result of additional boosting by the e-compressor 202. An extent of warming of the air may be controlled by several parameters, including how long the recirculation valve 210 is maintained in the at least partially open position.

For example, prior to engine cold starts under low ambient temperatures, such as during winter, the recirculation valve 210 may be fully opened and held open for a period of time that allows a portion of the intake air to recirculate through the e-compressor 202 three to five times (e.g., 3-5 passes through the e-compressor 202). In warmer ambient conditions, the recirculation valve 210 may be opened for a shorter period of time to pass intake air through the e-compressor 202 two to three times. Once a temperature of the intake air is determined, e.g., by an air temperature sensor at an outlet of the e-compressor 202 or by a manifold charge temperature (MCT) sensor, to increase to a target temperature, the engine 10 may be turned on. Closing of the recirculation valve 210 may be initiated upon detection of the target temperature or upon engine startup. As another example, a magnitude of a fraction of intake air that is warmed by recirculation may be adjusted by increasing or decreasing an opening of the recirculation valve 210.

In addition, an amount of work performed by the e-compressor 202, e.g., power input from the electric machine 265, may be selected by adjusting a mass flow rate and a desired compressor outlet temperature according to a pressure ratio across the e-compressor 202. Alternatively, if the power input is held constant, the desired compressor outlet temperature and pressure may be obtained by adjusting the mass flow rate into the e-compressor 202. Details of such adjustments will be described further below.

Engine 10 of FIG. 2 may also include a mass flow sensor 220 positioned immediately downstream of the e-compressor 202. The mass flow sensor 220 may measure a flow rate of intake air at an outlet of e-compressor 202 as the e-compressor 202 is spun by the electric machine 265. The measured flow rate may be used to estimate a period of time the recirculation valve 210 is to be maintained open for intake air to be recirculated through the e-compressor to achieve a desired temperature. The opening of the recirculation valve may be adjusted based on the measured flow rate. For example, if a specific amount of time is allowed prior to engine ignition for heating of intake air to occur, the recirculation valve may be adjusted to be more open if the mass flow rate is determined to be too low to raise intake air temperature within the given time period. The flow rate may also be used to estimate a pressure at the e-compressor outlet from which a pressure upstream of the CAC 263 may be inferred.

The warmed intake air that is recirculated through the e-compressor 202 may raise a temperature of the cylinders 30 when delivered to the intake manifold 44 and combusted. Engine load may be increased due to the combustion of heated intake air, hereafter referred to as load shifting, which may increase exhaust gas temperatures and mass flow rates through the exhaust manifold 48. The higher exhaust gas temperatures and mass flow rates may transfer heat to the emissions device 71, resulting in faster catalyst light-off. In one example, excess air accumulated in the intake system due to operation of the e-compressor 202 may also be used to control regeneration of the DPF (or lean burning GPF) while the DPF/GPF is active.

During regeneration of the DPF/GPF, a vehicle tip-out from a higher load to idling or low load may occur. The rapid drop to low load causes the turbocharger speed to slow and thus the turbocharger may not deliver sufficient air to the engine and exhaust system to maintain target particulate filter temperature, potentially leading to filter over temperature events, which may degrade the particulate filter. To mitigate this issue, additional air may be supplied by e-compressor 202, thereby maintaining temperature gradients between a wall of the DPF/GPF and gas flowing through the emissions device 71 through heat transfer from the wall to the gas. A likelihood of a temperature of the DPF/GPF wall rising to an extent that degrades the DPF/GPF is thus reduced. As another example, the e-compressor 202 may also be used to provide extra air flow in excess of air flow supplied by the turbocharger in order to allow injection of additional fuel during active DPF/GPF regeneration to regulate an inlet temperature of the DPF-GPF to mitigate excessive filter loading.

The heated boosted and recirculated intake air passes through the CAC 263 prior to delivery at the intake manifold 44. The cooling effect of the CAC 263 on the intake air may undesirably offset the increase in temperature obtained by recirculation. By configuring the engine 10 with a CAC bypass 212, at least a portion of the air flow may be diverted around the CAC 263, thereby reducing the amount of cooling imposed on the air by the CAC 263.

Engine 10 in FIG. 2 may include the CAC bypass 212 to provide a path for air flow around the CAC 263. Flow through the CAC bypass 212 may be controlled by a bypass valve 214 arranged in the CAC bypass 212 that may open the CAC bypass 212 or block the CAC bypass 212 depending on a position of the bypass valve 214. In one example, the bypass valve 214 may be adjusted between a fully open position and a closed position and in other examples, the bypass valve 214 may be continuously adjustable to any position between the fully open and fully closed positions. When the bypass valve 214 is closed, intake air flowing through intake plenum 42 towards the intake manifold 44 passes through, and is cooled, by the CAC 263. However, when the bypass valve 214 is opened, at least a portion of the intake air is diverted through the CAC bypass 212 and not cooled before reaching the intake manifold 44.

The controller may coordinate opening of the bypass valve 214 of the CAC bypass 212 when instructing the recirculation valve 210 of the recirculation passage 208 to open. This reduces the cooling effect of the CAC 263 on air that has been recirculated through the e-compressor 202, warmed and flowed through the turbocharger compressor 262 (or from the compressor of the electric turbocharger to the CAC 263 if engine 10 is configured with the electric turbocharger instead of the e-compressor). The bypass valve 214 may be configured to open when the recirculation valve 210 is opened and to close when targeted temperatures of the cylinders 30 and the emissions device 71 are attained.

In another embodiment 300 of the engine 10 shown in FIG. 3, a recirculation passage 302 with a recirculation valve 304 may return air from the boost chamber 46 from a region downstream of an outlet of the bypass passage 212 and upstream of the throttle 62 to a region upstream of the e-compressor 202. An e-booster bypass 303, configured with an e-compressor bypass valve 305, may branch off from the recirculation passage 302, coupling a region of the recirculation passage 302 upstream of the recirculation valve 304 to the boost chamber 46, downstream of the e-compressor 202 and upstream of the turbocharger compressor 262. The e-compressor bypass 303 may provide a path for air flow around the e-compressor 202, when the e-compressor 202 is deactivated and the recirculation valve 304 closed. When the e-compressor 202 is inactive, the positioning of the e-compressor 202 within the intake plenum 42 may restrict flow. By opening the e-compressor bypass valve 305, intake air may flow around the e-compressor 202 before passing through the turbocharger compressor 262 and the CAC 263.

The recirculation passage 302 may be longer in length than the recirculation passage 208 of FIG. 2, to allow the air to be recirculated from downstream of the CAC 263 instead of upstream of the CAC 263. By warming air that has passed through the CAC 263, a temperature of the air delivered to the intake manifold 44 may be controlled with higher precision than the configuration of the recirculation passage 208 of FIG. 2. Furthermore, control of the temperature may be independent of the degree of load shifting when the engine 10 is adapted with the recirculation passage 302 of FIG. 3.

The engine 10 may be configured with an electrically assisted boosting system, as shown in embodiments 400 and 500 of FIGS. 4 and 5, respectively, that includes the e-booster 402 positioned downstream of both a turbocharger compressor 462 and a CAC 463 and driven by an electric machine 465. A mass flow sensor 420, similar to the mass flow sensor 220 of FIGS. 2-3, is arranged immediately downstream of e-booster 402 to monitor mass flow rate at an outlet of the e-booster 402. As shown in FIG. 4, the e-booster 402 may be adapted with a recirculation passage 404 and recirculation valve 406, operated similarly to the recirculation passage 208 and recirculation valve 210 of FIG. 2. Intake air, flowing into intake plenum 42 may be compressed by the turbocharger compressor 462 and continue flowing through the CAC 463 when the bypass valve 214 of the CAC bypass 212 is closed. The bypass valve 214 may be instructed to open when the recirculation valve 406 is opened. When the bypass valve 214 is open, at least a portion of the intake air may be diverted through the CAC bypass 212 so that the air is not cooled by the CAC 463.

The intake air flows from the turbocharger compressor 462, through or around the CAC 463, and into the e-booster 402. A portion of the boosted air emerging from the e-booster that is in excess of the boost demand at the engine 10 may be recirculated through the recirculation passage 404 when the recirculation valve 406 is at least partially open. Similar to recirculation valve 210 of FIG. 4, recirculation valve 210 may be adapted to alternate between a fully open position and a closed position or adjusted continuously to any position between fully opened and closed. The compressed and warmed intake air may flow through an opening of the throttle 62 to the intake manifold 44 to be combusted at the cylinders 30.

In the embodiments 200, 300, 400, and 500 of the engine 10 shown in FIGS. 2-5, respectively, the throttle 62 may be a flow restriction that controls a mass flow rate of air to the engine 10. Isenthalpic expansion of the air may reduce the pressure and density of the air downstream of the throttle 62 but maintain a temperature of the air through a throttling process. Flow restriction generated by the throttle 62 may be adjusted according to adjustment of the recirculation valve 406 to maintain a desired pressure and mass flow rate to the intake manifold 44.

As a result of higher intake air temperatures and load shifting, peak burned gas temperatures may also increase. Although higher burned gas temperatures may exacerbate formation of NOR, a faster catalyst light-off due to heating of the emission device 71 by the exhaust gas reduces a period of time where the catalyst is not yet active, thereby reducing an initial warmup period during which emission of NO and other combustion products is highest.

In the embodiment 500 of the engine 10 in FIG. 5, the turbocharger compressor 462, the CAC 463, the CAC bypass 212 and bypass valve 214, and the e-booster 402 are similarly oriented as in FIG. 4. In FIG. 5, however, a recirculation passage 502 may couple a region of the boost chamber 46 between the turbocharger compressor 462 and an inlet of the CAC bypass 212, upstream of the CAC 463, to a region between the e-booster 402 and the throttle 62. Flow through the recirculation passage 502 may be controlled by a recirculation valve 504 that, when opened, allows air downstream of the e-booster 402 to be returned to the region between the turbocharger compressor 462 and the CAC 463. The recirculated air may be a fraction of the intake air that exceeds a boost demand. Recirculation of intake air through the e-booster 402 increases a temperature of the air, thereby expediting engine warming and catalyst light-off.

An e-booster bypass 503, adapted with an e-booster bypass valve 505, may branch off the recirculation passage 502, coupling a region of the recirculation passage 502 downstream of the recirculation valve 504 to a region of the boost chamber 46 downstream of the CAC bypass 212 and upstream of the turbocharger compressor 462. Similar to the e-compressor bypass 303 and e-compressor bypass valve 305 of FIG. 3, when the e-booster 402 is inactive and the recirculation valve 504 is closed, e-booster bypass valve 505 may be opened to divert intake air that has been cooled by the CAC 463 around the e-booster 402 so that intake air is not restricted by the e-booster 402.

The arrangement of the recirculation passage 502 of FIG. 5 may subject at least a portion of the intake air to cooling by the CAC 163, offsetting the heating of intake imparted by recirculation. The configuration of the recirculation passage 404 of FIG. 4 may provide enhanced maintenance over the temperature of the air delivered to the intake manifold 44 through the throttle 62. However, the arrangement of the recirculation passage 404 may not control a temperature of the air emerging from the e-compressor outlet that is delivered to the intake manifold. The air temperature entering the intake manifold may be affected by variables such as thermal properties of components, compressor fouling, and end-gas knock. By configuring the recirculation passage 502 of FIG. 5 to return air upstream of the CAC 153, the recirculation valve may be adjusted in combination with the bypass valve 214 to obtain a desired air temperature according to current operating conditions.

The positioning of the e-compressor either upstream of the turbocharger compressor, as shown in FIGS. 2 and 3, or downstream of the turbocharger compressor as the e-booster 402, as shown in FIGS. 4 and 5, may operate with different levels of efficiency. Arranging the e-compressor upstream of the turbocharger compressor may provide unrestricted flow of intake air to the e-compressor inlet, thereby recirculating intake air rapidly. When the e-compressor is positioned downstream of the turbocharger compressor, however, the amount of intake air may be constrained by air flow through the stationary turbocharger compressor, thus reducing a rate of recirculation and heat transfer to the intake air.

The embodiments of the engine shown in FIGS. 2-5, while differing in positioning of elements relative to one another, such as the recirculation passage and compressor (e.g., e-compressor or e-booster) with respect to the turbocharger compressor and CAC, may all impose similar effects on intake air and exhaust gas temperatures. Recirculation of air through the compressor adds energy to the intake air through work transfer and load shifting (increase in engine load) raises exhaust gas temperatures and mass flow rates through the engine. The power input into the compressor may be determined according to:

$$\frac{dE}{dt} = \dot{Q} - \dot{W} + \dot{m}_{in}h_{in} - \dot{m}_{out}h_{out} \quad (1)$$

where E is energy, t is time, $\overline{Q}$ is the rate of heat transfer, $\overline{W}$ is power, a rate of work transfer, $\overline{m}_{in}$ is mass flow rate into the compressor, $\overline{m}_{out}$ is mass flow out of the compressor, $h_{in}$ is suction enthalpy and $h_{in}$ is discharge enthalpy. Assuming adiabatic, steady state, steady flow operation with constant specific heats, the compressor input power may be described by:

$$\overline{W} = \overline{m}_{in}(h_{in} - h_{out}) \approx \overline{m}_{in} c_p (T_{in} - T_{out}) \quad (2)$$

where $T_{in}$ is an inlet temperature of the compressor and $T_{out}$ is an outlet temperature of the compressor and $c_p$ is the specific heat of air. The isentropic outlet temperature $T_{out,s}$ is related to the inlet temperature $T_{in}$ by an adiabatic and reversible polytropic process:

$$T_{out,s} = T_{in}\left(\frac{p_{out}}{p_{in}}\right)^{\frac{\gamma-1}{\gamma}} \quad (3)$$

where $\gamma$ is the ratio of specific heats for an adiabatic and reversible process and $p_{in}$ is pressure at the inlet of the compressor and $p_{out}$ is pressure at the outlet of the compressor. A real outlet temperature, $T_{out}$, for the compressor may be obtained based on an efficiency of the compressor, $\eta_c$, $$\eta_c = \frac{W_{c,s}}{W_c} \approx \frac{T_{in} - T_{out,s}}{T_{in} - T_{out}} \quad (4)$$

where Wc,s is the isentropic work input into the compressor and $W_c$ is the actual work input into the compressor.

From these relationships (e.g., equations 1-4), a dependence of the input power ($\overline{W}$) and actual compressor outlet temperature ($T_{out}$) on the mass flow of air ($\overline{m}_{in}$) into the compressor and pressure at the outlet of the compressor may be determined, with the inlet temperature and inlet pressure of the compressor held constant. The outlet temperature may increase as the outlet pressure increases and the compressor input power may increase as mass flow rate into the compressor increases. The outlet pressure may be controlled by the input power provided by the electric machine to the compressor and the mass flow into the compressor may be adjusted by the throttle (e.g., throttle 62 of FIGS. 1-5) as well as the compressor load provided by the electric machine and the degree of opening of the recirculation valve. Thus combinations of input power and throttling may be used to adjust compressor operation to be within a high efficiency zone while achieving the desired work transfer from the compressor to the intake air.

The estimated values for work transfer and compressor outlet temperature may represent a theoretical maximum amount of work transfer and temperature increase according to input power from the electrical machine under ideal conditions. Under real operating conditions, some losses may occur, such as transfer of heat or friction loss to the surfaces of engine components, but work input may additionally be obtained from the turbocharger compressor, also arranged in the path of intake flow either upstream or downstream of the electrical compressor.

Alternatively, if the input power supplied to the compressor is held constant, compressor outlet temperature and pressure may be increased by decreasing the mass flow rate into the compressor. This may arise from a tradeoff between mass flow rate and a temperature gradient across the compressor for a uniform amount of input power, as shown by equation 2. Thus when a consistent input power is to be supplied to the compressor so that the compressor is spun at a steady speed, throttling may allow the compressor outlet to reach a desired temperature.

Based on the methods for adjusting work transfer from the electrically driven compressor to intake air described above, a size of the compressor may be modified. The compressor may be reduced in size and configured to generate higher pressure ratios at lower mass flow rates than conventional e-compressor and e-boosters. Adapting the compressor with devices such as an active casing treatment and/or a variable inlet compressor may expand the compressor map width and assist in improving compressor performance to allow low mass flow, high pressure ratio operation as well as high mass flow, high pressure ratio at a set input power to expedite engine heating and catalyst light-off.

While operating to recirculate and heat intake air with the CAC bypass valve to direct at least a portion of the intake air around the CAC, the e-compressor or e-booster may still provide an amount of boost demanded by vehicle operation and introduce other beneficial effects on engine performance. As one example, the heated intake air may reduce ignition delays in a diesel engine, decreasing premixed combustion magnitude and reducing a likelihood of NVH issues. Peak burned gas temperatures may be raised and decrease a likelihood of incomplete combustion, also reducing cyclic variability. During cold engine starts, diesel compression ratios are conventionally maintained higher than ideal but may be adjusted to lower ratios when intake air is heated by recirculation. For a gasoline-fueled engine, preheating of intake air may increase flame speeds, improving cyclic variability and decreasing NVH issues and engine misfire.

In another example, the compressor may act as an electrical load on the vehicle battery, allowing the engine, even with a fully charged battery, to be operated at a higher load than loading due to tractive effort and auxiliary loads. With a hybrid powertrain, a resultant load shifting effect may increase exhaust gas enthalpy and temperature as well as mass flow rate, for both gasoline and diesel engines. Furthermore, intake throttling of diesel engines may allow a use of uncooled HP-EGR, in spite of a negative effect of the electrically-driven compressor on a pressure ratio across the intake and exhaust manifolds. Uncooled HP-EGR may further raise the temperature of the intake air to increase combustion stability and raise temperatures of residual exhaust gas and EGR which contributes additionally to combustion stability and higher exhaust gas temperature.

Figure 6:
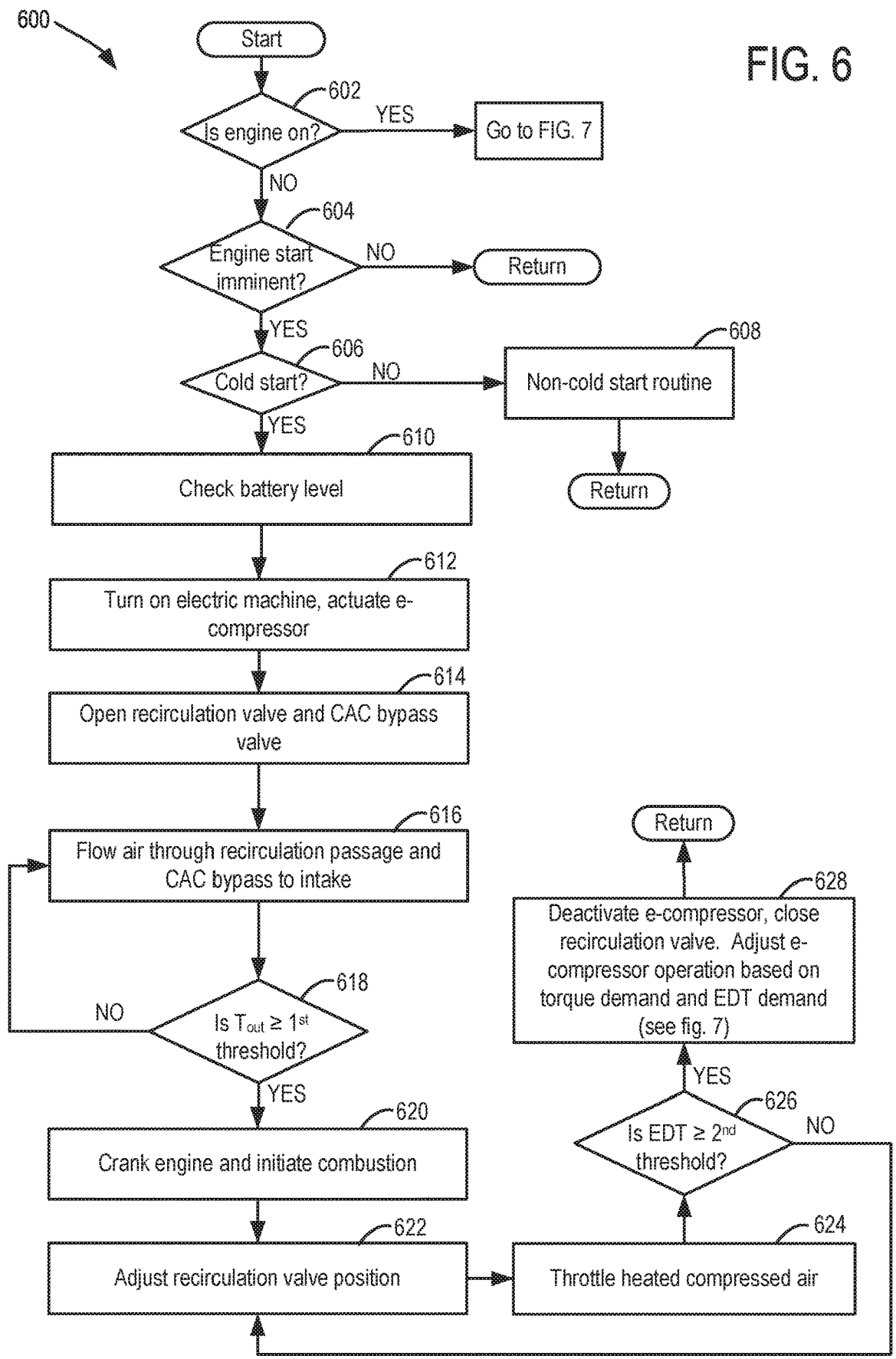
FIG. 6 shows a first example routine for operating an electrically-driven compressor to drive air flow through a compressor recirculation passage to heat intake air.
Figure 7:
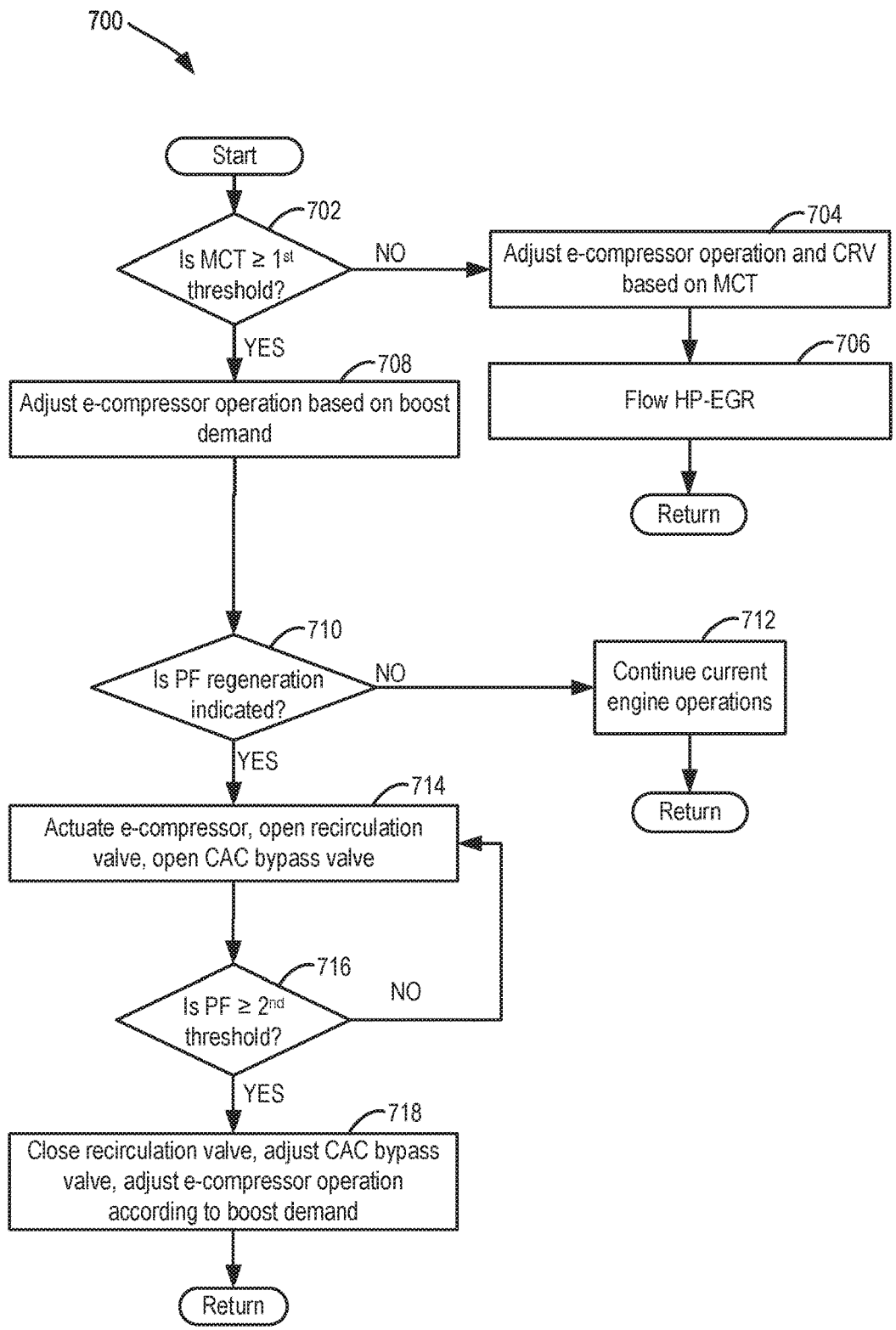
FIG. 7 shows a second example routine for operating an electrically-driven compressor to drive air flow through a compressor recirculation passage to heat intake air.
Figure 8:
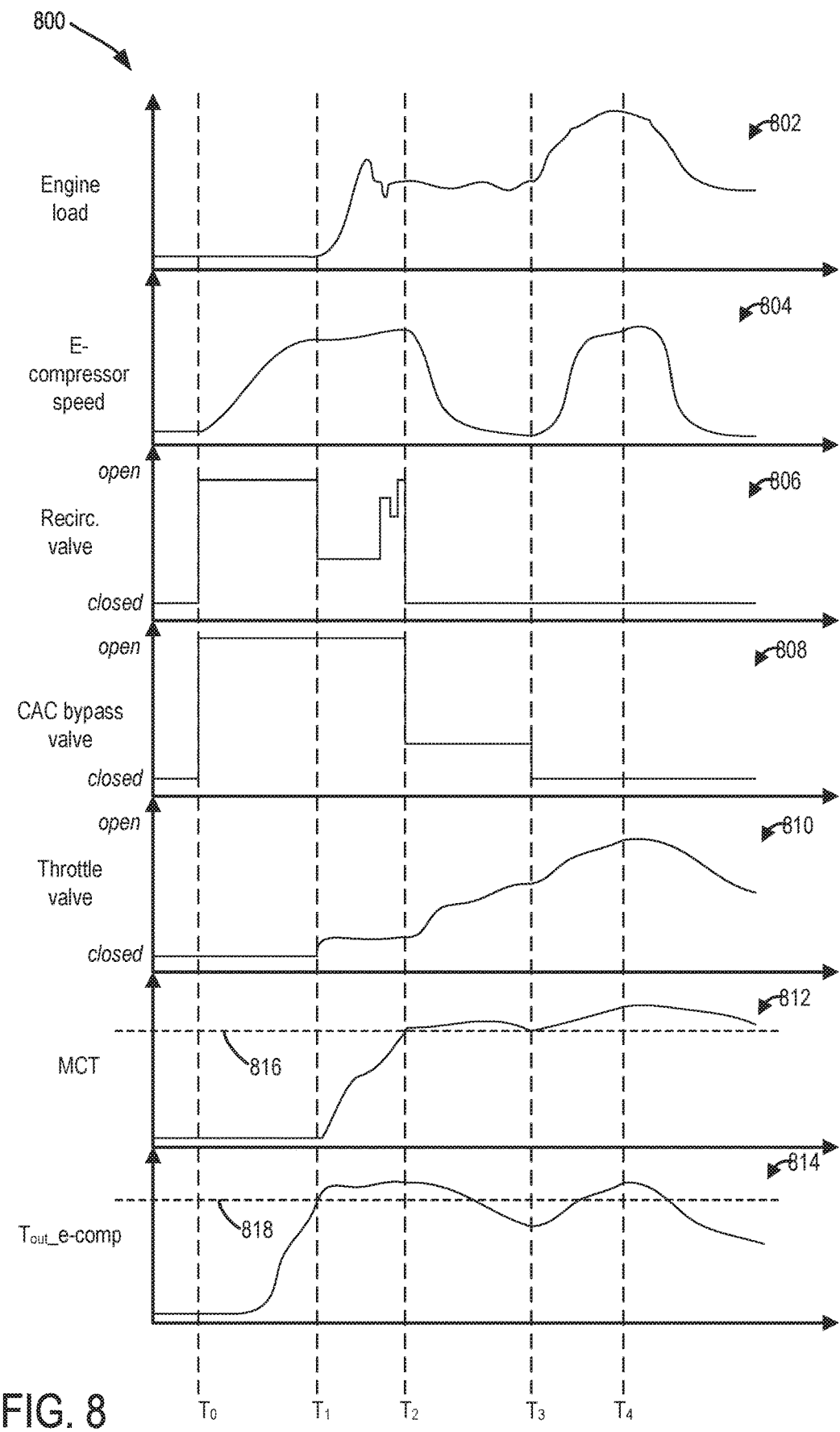
FIG. 8 shows operations of various actuators during engine cold start and engine parameters in response to the operations over time.

Examples of methods for operating an engine system of a hybrid vehicle are shown by methods 600 and 700 in FIGS. 6 and 7. Method 600 depicts a routine for heating intake air prior to a cold engine start and method 700 shows a routine for engine operations during warm starts. An intake system of the engine includes a compressor (e-compressor) driven by an electric machine, such as the e-compressor 202 of FIGS. 2-3 and the e-booster 402 of FIGS. 4-5, positioned upstream or downstream of a turbocharger compressor and a charge-air cooler (CAC) in an intake passage. An emissions device, such as the emissions device 71 of FIG. 1-5, may be arranged in an exhaust system of the engine, downstream of combustion chambers of the engine. A recirculation passage with a recirculation valve (e.g., recirculation valve 210, 304, 406, or 504) may couple a region of the intake passage downstream of the e-compressor to a region of the intake passage upstream of the e-compressor, allowing air be returned from an outlet of the e-compressor to an inlet of the e-compressor. The air flowing through the recirculation passage may be recirculated through just the e-compressor or both the e-compressor and the turbocharger compressor. The CAC may be adapted with a CAC bypass and a bypass valve to divert at least a portion of the intake air around the CAC. Instructions for carrying out methods 600 and 700 and the rest of the methods included herein may be executed by a controller based on instructions stored on a memory of the controller, such as controller 12 of FIG. 1, and in conjunction with signals received from sensors of the engine system, such as the sensors described above with reference to FIG. 1. The controller may employ engine actuators of the engine system to adjust engine operation, according to the methods described below.

At 602, the method includes confirming if the engine is on, e.g., if the engine is combusting air and fuel. If the engine is on, the method moves to method 700 of FIG. 7. If the engine is not on, the method proceeds to 604.

At 604, the method includes determining if starting of the engine is imminent. Anticipating the engine start may be based on an indicating action, such as, the operator opening a driver side door of the vehicle, or the operator sitting in a driver seat. In other examples, insertion of a key into a car door or an engine ignition, e.g., key-on event, a manual trigger such as a button or switch, or remote activation, may indicate the engine is to be turned on. In still further examples, an imminent engine start may be determined based on preset operator schedule. For example, an operator may enter an engine start time into a schedule via a user interface of the vehicle or via a remote device in communication with the vehicle (e.g., via a smart phone). If no indication is provided that engine start is imminent, method 600 returns to the start of the method. However, if engine activation is anticipated, the method continues to 606 to determine if the engine is under cold start.

Determining if the engine startup is cold may include comparing a manifold charge temperature, measured by an intake temperature sensor such as sensor 121 of FIG. 1, a coolant temperature, or a cylinder temperature, to a minimum temperature. The minimum temperature may be a temperature representing a low end of a range of engine operating temperatures, such as 90° C., or a temperature within a threshold, e.g., within 10%, of an operating temperature of the engine at idle. In another example, engine cold start may be indicated when the engine temperature (e.g., measured by engine coolant temperature) is equal to ambient temperature. Alternatively, engine cold start may be determined based on ambient temperature and a duration of time elapsed since last engine operation.

Engine startup may be cold due to cooling of the engine over a period of time that the engine has been stationary and turned off. The rate at which cooling occurs may depend on an ambient temperature or how long the engine was last active. The engine may also be under cold start when the vehicle is a hybrid vehicle and operating in an electric propulsion mode with the engine turned off. This may occur when the vehicle is stationary and idling or during cruising when engine load is low. If the engine is off for a prolonged period of time, the engine may cool below the minimum temperature for a non-cold start. The hybrid engine may be adapted to actuate the e-compressor and heat intake air during idling or cruising operation to decrease a delay in engine performance due to warming.

If the engine is not under cold start, method 600 moves to 608 to initiate engine start following a non-cold start routine without a delay. The non-cold start routine may include cranking the engine with a starter motor immediately upon detection of the MCT, for example, above the minimum temperature, flowing intake air to combustion chambers of the engine, and injecting fuel. The air/fuel mixture ignites in the combustion chambers, driving rotation of the crankshaft and, once the transmission is shifted into a drive gear, powering motion of the vehicle. If cold start is confirmed at 606, the method proceeds to 610 to check a state of charge (e.g., power level) of a vehicle battery, such as the battery 8 of FIG. 1.

The controller may compare the detected state of charge to a minimum amount of charge that is sufficient to supply power to the electric machine to operate the e-compressor as well as to turn the engine on. If the battery does not have enough energy stored to perform such operations, the method does not preheat intake air prior to engine startup. If the battery is charged enough to meet or surpass the minimum amount of power, the method proceeds to 612.

At 612 of the method, the electric machine is activated to power a rotation of the e-compressor. The method continues to 614 to at least partially open the recirculation valve (e.g., open the recirculation valve to a fully open position or to a position between fully open and closed) and open the bypass valve of the CAC bypass (such as valve 214). Intake air flows through the recirculation passage at 616 in a direction opposite of flow through the intake passage, returning to the inlet of e-compressor to be further compressed and warmed.

As air is recirculated through the recirculation passage, a mass flow rate may be measured at the e-compressor outlet by a mass flow sensor, such as the mass flow sensor 220 of FIGS. 2-3 and 420 of FIGS. 4-5. The mass flow rate may be used by the controller to estimate a period of time that allows intake air to recirculate through the e-compressor by enough passes to heat the intake air to a desired temperature for warming of the engine cylinders. Alternatively, the mass flow rate may be used to adjust the recirculation valve to increase or decrease flow through the e-compressor to obtain a desired temperature of the intake air.

At 618, the method include comparing a temperature at an outlet of the e-compressor to a first threshold temperature. The first threshold temperature may be a minimum temperature to which recirculated air is heated in order to transfer enough heat to the intake manifold and combustion cylinders to raise a temperature of exhaust gas. The exhaust gas may transfer heat to the emissions device and the resulting temperature increase of the emissions device may allow catalyst light-off to occur over a shorter duration of time. In one example, the first threshold temperature at the e-compressor outlet may be 150° C.

If the outlet temperature of the e-compressor does not reach the first threshold temperature, the method returns to 616 to continue heating the intake air by flowing the intake air through the recirculation passage to return the intake to the e-compressor inlet. If the outlet temperature meets or exceeds the first threshold temperature, the method proceeds to 620 to turn the engine on. Turning on the engine includes cranking the engine and initiating combustion of air and fuel at the combustion chambers. In another example, the controller may indicate that the engine is ready to be turned on based on a detected manifold charge air temperature (MCT) reaching a pre-set temperature estimated to sufficiently increase exhaust gas temperature to facilitate rapid catalyst light-off. Alternatively, during any indications of imminent engine startup, as described above, a pre-set time delay may be included to accommodate actuation of the e-compressor and sufficient heating of intake air before cranking of the engine is executed. Monitoring of mass flow rate at the e-compressor outlet may be used to adjust the intake throttle to increase mass flow based on a temperature shortfall between the measured outlet temperature of the e-compressor and the first temperature threshold. The mass flow is adjusted to ensure that the intake air is heated enough during the amount of time allotted for recirculation and heating before the engine is turned on.

During engine cranking, the opening of the recirculation valve of the recirculation passage may be briefly decreased or closed to increase intake air flow to the combustion chambers during ignition to reduce a likelihood that the engine is starved of oxygen, e.g., running overly rich. Once the engine is on, the opening of the recirculation valve may be increased or decreased at 622 according to fluctuations occurring during initial stages of engine activation. When combustion is stabilized, the recirculation valve may be adjusted based on a target air-to-fuel ratio at the cylinders in combination with a desired mass flow rate through the e-compressor to obtain a desired increase in intake manifold temperature.

Adjustments in mass flow and delivery of intake air to the combustion cylinders may also be controlled by the intake throttle. The opening of the throttle valve may be adjusted at 624 in combination with the recirculation valve to provide a desired mass flow rate during engine cranking and combustion. However, throttling to obtain higher intake manifold temperatures may incur parasitic loading of the e-compressor due to the increased e-compressor outlet pressure, which may reduce vehicle efficiency but benefit catalyst light-off time. The throttle and recirculation valve positions may be balanced to provide a load shifting that decreases energy consumption while heating the emissions device sufficiently.

The throttle may be set to an idle position initially upon engine startup, with the throttle valve slightly open. With the engine on, the controller may command adjustment of the throttle position according to a desired mass flow rate through the e-compressor. A power input from the electric machine to the e-compressor may be concurrently adjusted so that the combination of the mass flow rate and pressure ratio of the compressor (where the pressure ratio is a function of the power input to the e-compressor and work transfer from the e-compressor to the air) allows the compressor to operate in a high efficiency zone while providing a desired amount of heating to the engine intake and emissions device.

For example, throttling may be adjusted to obtain a desired mass flow rate of air to the engine. The controller may refer to a look-up table with the mass flow rate, which may be measured by a mass flow sensor in the intake manifold, and a pre-set manifold pressure as inputs and a system pressure (e.g., a pressure ratio or pressure differential between the exhaust and the intake manifolds) as an output. The system pressure may be compared to a pre-determined pressure that allows HP-EGR to be used and both the throttle opening and the recirculation valve opening may be adjusted to achieve a desired system pressure.

At 626, the method includes comparing the temperature of the emissions device (EDT) to a second threshold temperature. The EDT increases due to combustion of heated intake air at the combustion chambers, producing hotter exhaust gas. The temperature of the second threshold may be based on an estimated minimum temperature of the emissions device in order for increased combustion efficiency and stability at the combustion chambers, thereby mitigating incomplete combustion and vehicle NVH issues, and faster catalyst light-off. In other examples, the temperature may be measured at the combustion chambers and similarly compared to a threshold temperature. The threshold temperature may be a temperature that represents an increased peak burned gas temperature that allows for complete and stable combustion and results in generation of exhaust gas that is hot enough to expedite catalyst light-off.

If the EDT does not reach the second threshold temperature, the method returns to 622 to adjust the recirculation valve to increase or maintain heating of intake air through the e-compressor with the CAC bypass open. If the EDT matches or exceeds the second threshold temperature, method proceeds to 628 to deactivate the e-compressor and close the recirculation valve. In the engine configurations of FIGS. 2 and 4, the CAC bypass valve may be closed, or the opening decreased to allow the CAC to cool and increase a density of boosted intake air to increase a combustion efficiency and power output of the engine after the initial warming of the intake manifold has been achieved. The recirculation valve may remain open to allow intake air to flow around the inactive e-compressor so that air flow to the intake manifold is not restricted by the e-compressor.

Alternatively, for the engine configurations of FIGS. 3 and 5, the recirculation valve may be closed and an e-compressor bypass valve opened to allow intake air to be diverted around the e-compressor so that air flow is not restricted to the intake manifold. The air is cooled by the CAC either before (as in FIG. 5) or after (as in FIG. 3) flowing through e-compressor bypass. In addition, exhaust pressure may increase sufficiently to drive rotation of an exhaust turbine of the turbocharger. The turbocharger compressor may thus supply enough torque to meet the torque demand and the e-compressor may be deactivated. The method may return to 602 to continually monitor engine status and temperatures of the intake manifold, combustion chambers, and emissions device to operate the e-compressor according to the said parameters.

The e-compressor may be re-activated, with the recirculation valve closed, if the torque demand exceeds the amount of boost provided by the turbocharger compressor. The torque shortfall may be addressed by additional compression of intake air by the e-compressor. In addition, the e-compressor may be re-activated and the recirculation valve opened if the EDT is detected to fall below the second threshold temperature. During occasions where both a torque shortfall and a decrease in EDT below the second threshold temperature is detected, accommodating the torque shortfall and generating additional boost with the recirculation valve closed may be prioritized.

In some examples, the e-compressor may be activated to manage air mass flow rate/energy release rate (e.g. fueling) independent of the operation of the turbocharger and/or throttle position in an active DPF or lean GPF system. The e-compressor may serve as a protective device in the event of active DPF thermal runaway, which may occur during tip-out when air mass flow rates are insufficient within the DPF to control increases in filter and housing temperatures.

Turning now to FIG. 7, at 702 of method 700, the MCT may be compared to a first threshold temperature. The first threshold temperature may be based on the temperature at which the combustion cylinders of the engine are sufficiently heated to provide stable and complete combustion, resulting in a reduction in NVH issues and producing exhaust gas that is hot enough to maintain the emissions device at or above the light-off temperature. In another example, the temperature of the combustion chambers or of the emissions device may be compared to a threshold temperature instead of the MCT that similarly allows for increased combustion stability and EDT that maintains the activity of the catalyst.

If the MCT is lower than the first threshold temperature, the method proceeds to 704 to adjust operation of the e-compressor based on the MCT. For example, the controller may command actuation of the e-compressor and opening of the recirculation valve of the recirculation passage. With the bypass valve of the CAC bypass also open, air may be recirculated through the e-compressor until the MCT reaches the first threshold temperature. At 706, HP-EGR may be flowed during heating of intake air by recirculation. While HP-EGR may not be flowed during boosting of air in conventional e-boosted turbocharged engine systems, the throttling of recirculated intake air in order to achieve a desired work transfer from the e-compressor to the intake air may provide a pressure gradient between the intake and exhaust manifolds that allows concurrent HP-EGR flow. The method may return to the start to again compare the MCT to the first threshold.

Returning to 702, if the MCT is at least equal to the first threshold temperature, method 700 continues to 708 adjust operation of the e-compressor based on a boost demand. For example, the boost demand may be indicated by a position of an input, such as the accelerator pedal 130 of FIG. 1. If the boost demand exceeds that provided by the turbocharger compressor, the electric machine may power the rotation of the e-compressor and spin the e-compressor at a speed that accommodates the boost shortfall. At 710, the method includes determining if regeneration of the particulate filter (PF) is indicated. Indication of a request for PF regeneration may include detection of a particulate matter load of the PF reaching a pre-set maximum load, such as 90% of a maximum load, which may be detected based on a pressure drop across the particulate filter. However, if PF regeneration is not indicated, the method proceeds to 712 to continue engine operations according to current boost demand, engine load, engine speed, etc.

If PF regeneration is demanded, the method proceeds to 714 to actuate the e-compressor through power input from the electric machine and to open the recirculation valve of the recirculation passage. The CAC bypass valve is also opened to allow intake air to recirculate through the e-compressor to heat intake air by work transfer from the e-compressor while bypassing at least a portion of the intake air around the CAC to reduce a cooling effect of the CAC on the air. A post-injection event may occur at the combustion chambers where fuel is injected into the combustion chambers but not burnt. The unburnt fuel is delivered to the emissions device where the fuel, upon heating, is a reductant, assisting in oxidation of particulate matter trapped in the PF. Additionally, HP-EGR may be flowed while the e-compressor is active and the recirculation valve is open.

In some examples, PF regeneration may be initiated using boosted air provided by the turbocharger compressor. However, a vehicle tip-out may occur during regeneration, resulting in insufficient supply of air to the PF from the turbocharger compressor. The e-compressor may be activated to supplement the air flow for PF regeneration with the recirculation valve closed to funnel all compressed air to the engine. In addition, excess fuel may be injected to facilitate active regeneration in response to the extra air flow, thereby allowing regulation of the PF temperature and mitigating excessive filter loading.

A temperature of the PF may be compared to a second threshold temperature at 716 of method 700. The second threshold temperature may be a regeneration temperature of the PF, such as 600° C. If the PF is below the second threshold temperature, the method returns to 714 to continue heating the combustion chambers by heating intake air via recirculation through the e-compressor and flowing HP-EGR. If the PF is at least equal to the second threshold temperature, the method continues to 718.

At 718, the method includes, after maintaining the temperature of the PF at or above the second temperature threshold for a pre-set period of time sufficient for PF regeneration, closing the recirculation valve, adjusting the CAC bypass valve to provide a desired amount of cooling to boosted air, and adjusting e-compressor operation. Adjusting e-compressor operation may include deactivating the e-compressor if the boost demand is met by the turbocharger compressor, or rotating the e-compressor at a speed that supplies an amount of boost to match the boost shortfall if the boost demand exceeds the boost supply from the turbocharger compressor. HP-EGR may be terminated if the e-compressor remains in operation or may continue flowing if boost demand is low and the e-compressor is deactivated. Following 718, the method returns to 702 to continue monitoring the MCT and adjusting engine operations accordingly.

FIG. 8 shows an example operation map 800 for a hybrid engine system under cold start, including an engine load (plot 802), an e-compressor speed (plot 804), a position of a recirculation valve (plot 806) of a recirculation passage around the e-compressor, a position of a CAC bypass valve (plot 808) of a CAC bypass passage, a position of an intake throttle valve (plot 810), a manifold charge temperature (MCT, plot 812), and a temperature at an outlet of the e-compressor (plot 814). The MCT at plot 812 includes a MCT threshold temperature (line 816) that represents a minimum temperature to which the MCT may be heated that increases combustion completeness and stability and allows exhaust gas temperature to increase. The outlet temperature of the e-compressor at plot 814 may include an outlet threshold temperature (line 818) that represents a temperature of intake air recirculated through the e-compressor that is sufficiently heated to raise the temperature of the MCT to the MCT threshold temperature.

The x-axis of the plots in FIG. 8 demonstrates time, and the time increases from left to right as indicated by the arrows. Before time $T_0$, the engine is not loaded and e-compressor is stationary, the recirculation and CAC bypass valves are closed, the throttle valve is closed, and MCT and e-compressor outlet temperature are low, well below the MCT and outlet temperature thresholds.

At $T_0$, heating of intake air is initiated. The controller commands the heating of intake air due to an imminent engine start indicated by detection of the MCT below a temperature that allows for complete and stable combustion and/or below a temperature that produces an exhaust gas temperature that is high enough to facilitate catalyst light-off at the emissions device. An electric machine supplies power to the e-compressor, accelerating a rotation of the e-compressor, increasing the speed of the e-compressor between $T_0$ and $T_1$. The recirculation valve is opened, allowing intake air to be returned to an inlet of the e-compressor from downstream of the e-compressor and heated while the CAC bypass valve is opened to bypass at least a portion of the heated intake air around the CAC. The throttle valve remains closed between $T_0$ and $T_1$. The MCT remains low while the e-compressor outlet temperature increases between $T_0$.

At $T_1$, the e-compressor outlet temperature reaches the outlet temperature threshold. Detection of the e-compressor outlet temperature reaching the threshold triggers the cranking of the engine and engine load rises. The speed of the e-compressor remains relatively uniform but the opening of the recirculation valve is decreased to increase an amount of intake air delivered to an intake manifold of the engine. The amount of boost imparted to the intake air by recirculation through the e-compressor exceeds the boost demand of the engine. The CAC bypass valve is maintained open while an opening of the throttle valve increases to an idle position to deliver intake air to the combustion chambers. The MCT begins to rise while a rate of increase in e-compressor outlet temperature is reduced.

Between $T_1$ and $T_2$, the recirculation valve is opened more to decrease flow to the engine to prevent excess flow of heated, compressed intake air to the combustion chambers that could overload the engine. The change in flow may lead to an under-loading of the engine, which is addressed by briefly decreasing the opening of the recirculation valve. As engine load stabilizes, the recirculation valve opening is increased.

Adjustment of the recirculation valve in response to engine load may be particularly beneficial for a spark ignited engine. For a diesel engine, however, the air-fuel ratio may be enriched (if not at the rich limit) by injecting more fuel, decreasing the beneficial effects of the recirculation valve adjustment. The recirculation valve may be used with a more closed throttle position to enable higher intake manifold temperatures thereby facilitating aftertreatment light off. However, this may occur at a cost of increased e-compressor/turbo parasitic loadings (due to the increased e-compressor/turbo outlet pressure), reducing vehicle efficiency but may load shift the engine to a higher load, thereby benefitting aftertreatment light off time. A balance between throttle and recirculation valve positions and load shifting may be found to minimize energy consumption while achieving the desired aftertreatment out emissions levels to satisfy emissions requirements.

At $T_2$, the MCT reaches the MCT threshold temperature. The e-compressor is deactivated and decelerates to become stationary. The recirculation valve is closed and the opening of the CAC bypass valve is decreased to provide increased cooling of boosted air. The throttle valve opening is increased as engine load remains steady. The MCT remains above the MCT threshold while the e-compressor outlet temperature gradually decreases.

The e-compressor is reactivated at $T_3$ in response to an increase in engine load. The torque demand is greater than the amount of boost provided by the turbocharger compressor and the electric machine is instructed to operate the e-compressor to assist the turbocharger compressor in compressing intake air. The speed of the e-compressor increases between $T_3$ and $T_4$ and the CAC bypass valve is closed to allow the CAC to cool and increase the density of the boosted intake air. The recirculation valve is maintained closed and the throttle valve is opened to increase mass flow through the intake system and to the engine. Between $T_3$ and $T_4$, the MCT and the outlet temperature of the e-compressor rises.

At $T_4$, the engine load begins to decrease, resulting in reduced torque demand. The torque demand decreases enough that the turbocharger compressor is able to supply the desired amount of boost to the engine without assistance from the e-compressor. The e-compressor is deactivated, slowing to a stop. The CAC bypass valve is maintained closed and the opening of the throttle valve is reduced to adjust the mass flow rate to the engine according to the torque demand. The recirculation valve is opened for engine configurations similar to those of FIGS. 2 and 4 but closed for engine configurations of FIGS. 3 and 5. For the configurations of FIGS. 3 and 5, an e-compressor bypass valve is opened. The MCT remains relatively high but decreases slightly while the outlet temperature of the e-compressor decreases at a faster rate.

In this way, an electrically driven compressor (e-compressor) may be positioned in an intake passage of a hybrid vehicle and used to enhance warming of an engine and an emissions device during cold engine startups. The e-compressor may be arranged upstream or downstream of a turbocharger compressor or may alternatively be a compressor of an electric turbocharger. A recirculation passage may couple a region of the intake passage downstream of the e-compressor outlet to a region of the intake passage upstream of the e-compressor inlet. When the e-compressor is actuated and a recirculation valve of the recirculation passage is opened, intake air may be flowed from downstream of the e-compressor to upstream of the e-compressor to recirculate air through the e-compressor. Work transfer from the e-compressor to the intake air heats the air and when the heated intake air is delivered to combustion chambers of the engine, the warmer intake air may result in increased combustion efficiency and also raise exhaust gas temperature. The higher exhaust gas temperature heats an emission device downstream of combustion chambers in an exhaust system coupled to the combustion chambers, reducing light-off time of the emission device. Efficiency of the emissions device during initial stages of engine startup is increased, reducing release of undesirable materials to the atmosphere. Furthermore, heating of intake air by recirculation through the e-compressor may facilitate regeneration of a gas particulate filter or diesel particulate filter in the emissions device while allowing HP-EGR flow. Thus, expedited engine and emissions device warming are enabled using an electrical system, powering the e-compressor, already present in the hybrid vehicle.

The technical effect of adapting a hybrid electric vehicle with a recirculation passage around an electric compressor is that a duration of time for engine warming and catalyst light-off is reduced and combustion efficiency and treatment of exhaust emissions is improved during cold engine starts.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

In one embodiment, a method includes prior to cold startup of an engine, operating an e-compressor and opening a recirculation valve of a recirculation passage coupled across the e-compressor to flow compressed intake air from an outlet of the e-compressor through the recirculation passage to an inlet of the e-compressor, and starting the engine upon a temperature at the outlet of the e-compressor reaching a threshold and continuing to operate the e-compressor while the engine is on. A first example of the method includes opening a bypass valve of a bypass passage of a charge-air cooler (CAC), the CAC arranged in the intake passage, to allow a portion of the intake air to flow through the bypass passage. A second example of the method optionally includes the first method and further includes, wherein operating the e-compressor prior to cold startup of the engine includes activating the e-compressor when a temperature of an intake manifold is below a threshold temperature. A third example of the method optionally includes one or more of the first and second examples, and further includes, wherein operating the e-compressor when the engine is on generates an e-compressor load that exceeds a demanded e-compressor load to meet a torque demand. A fourth example of the method optionally includes one or more of the first through third examples, and further includes, wherein operating the e-compressor includes powering rotation of the e-compressor by an electric machine receiving energy from an electrical system of the engine, an amount of power supplied by the electric machine based on a desired mass air flow rate of intake air and pressure of an intake manifold, the intake manifold located downstream of the e-compressor. A fifth example of the method optionally includes one or more of the first through fourth examples, and further includes, adjusting the amount of power supplied by the electric machine based on the threshold temperature at the outlet of the e-compressor. A sixth example of the method optionally includes one or more of the first through fifth examples, and further includes, wherein starting the engine comprises flowing recirculated, heated intake air from the outlet of the e-compressor to the engine and initiating combustion of the intake air in the engine, thereby heating the engine. A seventh example of the method optionally includes one or more of the first through sixth examples, and further includes, when the engine is on directing exhaust gas from the engine to one or more emissions devices and adjusting the recirculation valve based on a temperature of the one or more emissions devices. An eighth example of the method optionally includes one or more of the first through seventh examples, and further includes, when the engine is on adjusting an intake throttle in response to an amount of work transfer from the e-compressor to the intake air to adjust a mass flow through the e-compressor, thereby increasing a combustion temperature and an exhaust gas temperature. A ninth example of the method optionally includes one or more of the first through eighth examples, and further includes, operating the e-compressor and opening a bypass valve of a bypass passage of a charge air cooler in response to a command to regenerate a particulate filter.

As another embodiment, an engine system includes an intake system coupled to an exhaust system with combustion chambers positioned between the intake system and exhaust system, an intake passage of the intake system, upstream of the combustion chambers, configured with an electrically-driven compressor (e-compressor) and a charge-air cooler (CAC) arranged in a path of air flow, a recirculation passage coupling a region of the intake passage downstream of the e-compressor to a region of the intake passage upstream of the e-compressor, an emissions device arranged in the exhaust system downstream of the combustion chambers, and a controller configured with computer readable instructions stored on non-transitory memory, the instructions executable by the controller to, in response to an engine start request, when a manifold charge temperature (MCT) is lower than a threshold temperature, delay combustion at the engine, operate the e-compressor, and flow air through the recirculation passage to heat the air, and when the MCT is at least equal to the threshold temperature, initiate combustion in the engine. In a first example of the system, the recirculation passage is configured to recirculate air from an outlet of the e-compressor to an inlet of the e-compressor. A second example of the system optionally includes the first example, and further includes wherein the recirculation passage is configured to recirculate air from a region of the intake passage downstream of the e-compressor and the CAC to a region of the intake passage upstream of the e-compressor and upstream of the CAC. A third example of the system optionally includes one or more of the first and second examples, and further includes, wherein the e-compressor is downstream of both the CAC and a turbocharger compressor. A fourth example of the system optionally includes one or more of the first through third examples, and further includes, wherein the e-compressor is upstream of both the CAC and a turbocharger compressor. A fifth example of the system optionally includes one or more of the first through fourth examples, and further includes, further comprising a recirculation valve arranged in the recirculation passage, and wherein the instructions are executable to open the recirculation valve when the MCT is lower than the threshold temperature and close the recirculation valve when the MCT is at least equal to the threshold temperature. A sixth example of the system optionally includes one or more of the first through fifth examples, and further includes, further comprising a CAC bypass valve configured to control flow through a CAC bypass passage, and wherein the instructions are executable to open the CAC bypass valve when the MCT is lower than the threshold temperature.

As another embodiment, a method includes responsive to an intake manifold temperature falling below a first threshold temperature, activating an electrically-driven compressor (e-compressor) arranged in an intake passage to flow a portion of intake air through the e-compressor more than once via a recirculation passage by opening a recirculation valve of the recirculation passage, diverting air around a charge-air cooler (CAC), through a CAC bypass, by opening a bypass valve of the CAC bypass, the CAC also arranged in the intake passage, and throttling intake air delivered to combustion chambers of the engine by adjusting an opening of a throttle arranged downstream of the e-compressor and CAC in the intake passage and upstream of the combustion chambers. A first example of the method includes reducing respective openings of the recirculation valve and bypass valve upon detection of the intake manifold temperature reaching the first threshold temperature. A second example of the method optionally includes the first example, and further includes, reducing respective openings of the recirculation valve and bypass valve upon detection of a temperature of an emissions device reaching a second threshold temperature, the emissions device positioned in an exhaust passage coupled to the combustion chambers.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
prior to cold startup of an engine, operating an e-compressor and opening a recirculation valve of a recirculation passage coupled across the e-compressor to flow compressed intake air from an outlet of the e-compressor through the recirculation passage to an inlet of the e-compressor;
starting the engine upon a temperature at the outlet of the e-compressor reaching a first threshold temperature and continuing to operate the e-compressor while the engine is on; and
when the engine is on, adjusting an intake throttle in response to an amount of work transfer from the e-compressor to the intake air to adjust a mass flow through the e-compressor, thereby increasing a combustion temperature and an exhaust gas temperature.

2. The method of claim 1, further comprising opening a bypass valve of a bypass passage of a charge-air cooler (CAC), the CAC arranged in an intake passage, to allow at least a portion of the intake air to flow through the bypass passage.

3. The method of claim 1, wherein operating the e-compressor prior to cold startup of the engine includes activating the e-compressor when a temperature of an intake manifold is below a second threshold temperature.

4. The method of claim 1, wherein operating the e-compressor when the engine is on generates an e-compressor load that exceeds a demanded e-compressor load to meet a torque demand.

5. The method of claim 1, wherein operating the e-compressor includes powering rotation of the e-compressor by an electric machine receiving energy from an electrical system of the engine, an amount of power supplied by the electric machine based on a desired mass air flow rate of intake air and a pressure of an intake manifold, the intake manifold located downstream of the e-compressor.

6. The method of claim 5, further comprising adjusting the amount of power supplied by the electric machine based on the first threshold temperature of the temperature at the outlet of the e-compressor.

7. The method of claim 1, wherein starting the engine comprises flowing recirculated, heated intake air from the outlet of the e-compressor to the engine and initiating combustion of the intake air in the engine, thereby heating the engine.

8. The method of claim 1, further comprising, when the engine is on, directing exhaust gas from the engine to one or more emissions devices and adjusting the recirculation valve based on a temperature of the one or more emissions devices.

9. The method of claim 1, further comprising operating the e-compressor and opening a bypass valve of a bypass passage of a charge-air cooler in response to a command to regenerate a particulate filter.

10. A method for an engine, the method comprising:
responsive to an intake manifold temperature falling below a first threshold temperature, activating an electrically-driven compressor (e-compressor) arranged in an intake passage to flow a portion of intake air through the e-compressor more than once via a recirculation passage by opening a recirculation valve of the recirculation passage;
diverting air around a charge-air cooler (CAC), through a CAC bypass, by opening a bypass valve of the CAC bypass, the CAC also arranged in the intake passage;
throttling intake air delivered to combustion chambers of the engine by adjusting an opening of a throttle arranged downstream of the e-compressor and the CAC in the intake passage and upstream of the combustion chambers; and
when the engine is on, adjusting an intake throttle in response to an amount of work transfer from the e-compressor to the intake air to adjust a mass flow through the e-compressor, thereby increasing a combustion temperature and an exhaust gas temperature.

11. The method of claim 10, further comprising reducing respective openings of the recirculation valve and bypass valve upon detection of the intake manifold temperature reaching the first threshold temperature.

12. The method of claim 10, further comprising reducing respective openings of the recirculation valve and the bypass valve upon detection of a temperature of an emissions device reaching a second threshold temperature, the emissions device positioned in an exhaust passage coupled to the combustion chambers.

13. The method of claim 10, wherein operating the e-compressor when the engine is on generates an e-compressor load that exceeds a demanded e-compressor load to meet a torque demand, where a portion of the e-compressor load in excess of the demanded e-compressor load to meet the torque demand is recirculated through the recirculation passage when the recirculation valve is at least partially open.

14. The method of claim 10, wherein operating the e-compressor includes powering rotation of the e-compressor by an electric machine receiving energy from an electrical system of the engine, an amount of power supplied by the electric machine based on a desired mass air flow rate of intake air and a pressure of an intake manifold, the intake manifold located downstream of the e-compressor.

15. The method of claim 14, further comprising adjusting the amount of power supplied by the electric machine based on a third threshold temperature at an outlet of the e-compressor.

16. The method of claim 10, further comprising, when the engine is on, directing exhaust gas from the engine to one or more emissions devices and adjusting the recirculation valve based on a temperature of the one or more emissions devices.

17. The method of claim 10, further comprising operating the e-compressor and opening the bypass valve in response to a command to regenerate a particulate filter.

18. The method of claim 10, wherein the e-compressor is downstream of both the CAC and a turbocharger compressor.

19. A method, comprising, in response to an engine start request:
when one of an e-compressor outlet temperature and a manifold charge temperature is lower than a threshold temperature, delaying combustion at an engine, operating an e-compressor, and flowing air through each of a recirculation passage coupled across the e-compressor and a charge-air cooler bypass coupled across a charge-air cooler to heat the air, the recirculation passage flowing the air from an outlet of the e-compressor to an inlet of the e-compressor and the charge-air cooler bypass flowing the air from an inlet of the charge-air cooler to an outlet of the charge-air cooler; and thereafter
when the one of the e-compressor outlet temperature and the manifold charge temperature is at least equal to the threshold temperature, initiating combustion in the engine,
wherein the e-compressor is positioned downstream of the charge-air cooler in an intake passage,
subsequent to combustion being initiated in the engine, adjusting an intake throttle in response to an amount of work transfer from the e-compressor to the air to adjust a mass flow through the e-compressor, thereby increasing a combustion temperature and an exhaust gas temperature.

* * * * *